United States Patent Office
3,443,670
Patented May 13, 1969

3,443,670
HYDRAULIC AND MECHANICAL
BRAKE ACTUATOR
Hugh G. Margetts, Leamington Spa, England, assignor to Girling Limited, Tyseley, Birmingham, England
Filed Sept. 25, 1967, Ser. No. 670,234
Claims priority, application Great Britain, Oct. 1, 1966, 43,948/66
Int. Cl. F16d 65/14, 55/00, 19/00
U.S. Cl. 188—106
15 Claims

ABSTRACT OF THE DISCLOSURE

A brake actuator comprises hydraulic and mechanical actuators. The hydraulic actuator includes opposed hydraulic pistons in a through bore in a body member. A yoke slidably guided on the body member is abutted by one piston and supports an indirectly operated pad. The other piston abuts a directly operated pad. The mechanical actuator includes a face cam housed within the one piston and a second cam journalled in the one piston about an axis offset from the piston axis. The second cam has a lever at one side of the yoke and serves to turn the rotatable member of the face cam, which rotatable member acts upon a strut forming part of an automatic adjuster associated with said other piston. A bowden cable acts between the lever and the yoke.

The invention is applicable to drum brakes as well as disc brakes and also includes brakes in which the automatic adjuster is associated with a cylinder body in which the first-mentioned piston is slidable.

---

The invention relates to actuating mechanisms for brakes, such as vehicle brakes.

According to the present invention, a brake actuating mechanism has a hydraulic actuator which includes a piston, adapted to act at least indirectly on a brake pad, and a reaction member, the hydraulic pressure acting between said piston and said reaction member, and having a mechanical actuator which comprises a face cam operative between said reaction member and said brake pad and a second cam rotatable about an axis offset from the piston axis and engaging the movable part of said face cam for angularly displacing said movable part.

By suitably fitting a lever to the second cam, the face cam can be recommodated within the piston, so enabling the axial length of the brake mechanism to be reduced.

The invention is further described, by way of example, with reference to the accompanying drawings in which.

Figure 1:
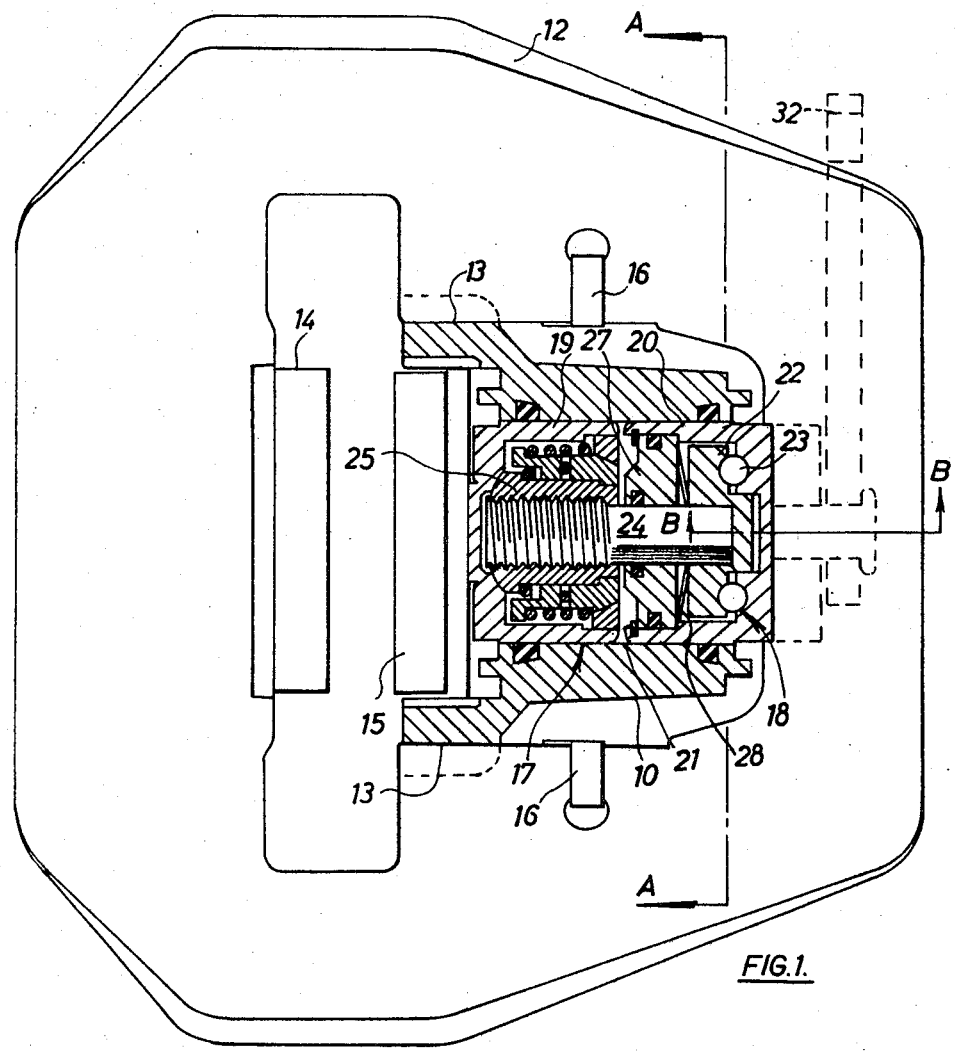
FIG. 1 is an inverted sectional plan view of one embodiment of brake constructed in accordance with the invention.
Figure 2:
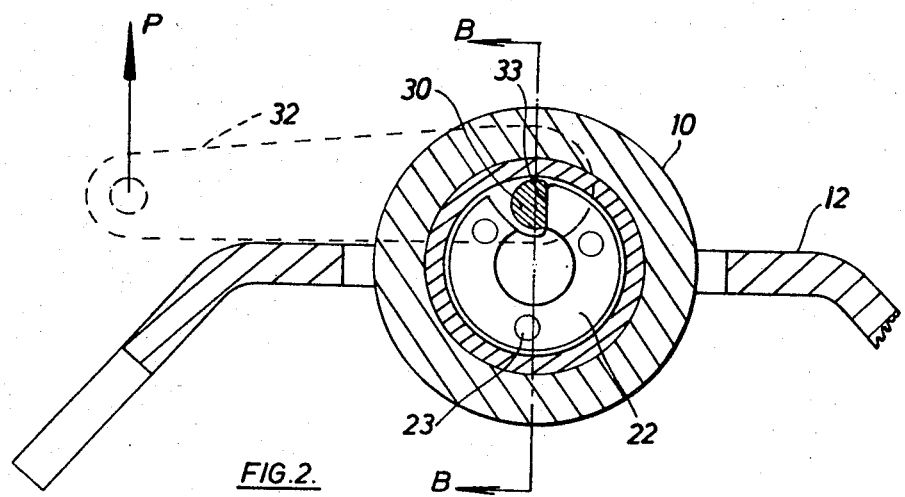
FIG. 2 is a section on the line A—A of FIG. 1.
Figure 3:
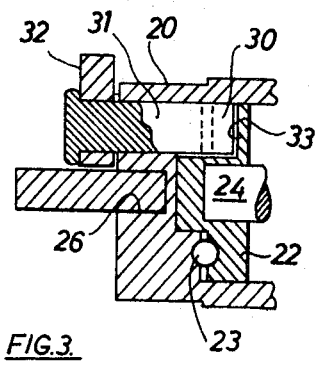
FIG. 3 is a fragmentary section on the lines B—B of FIGS. 1 and 2.
Figure 4:
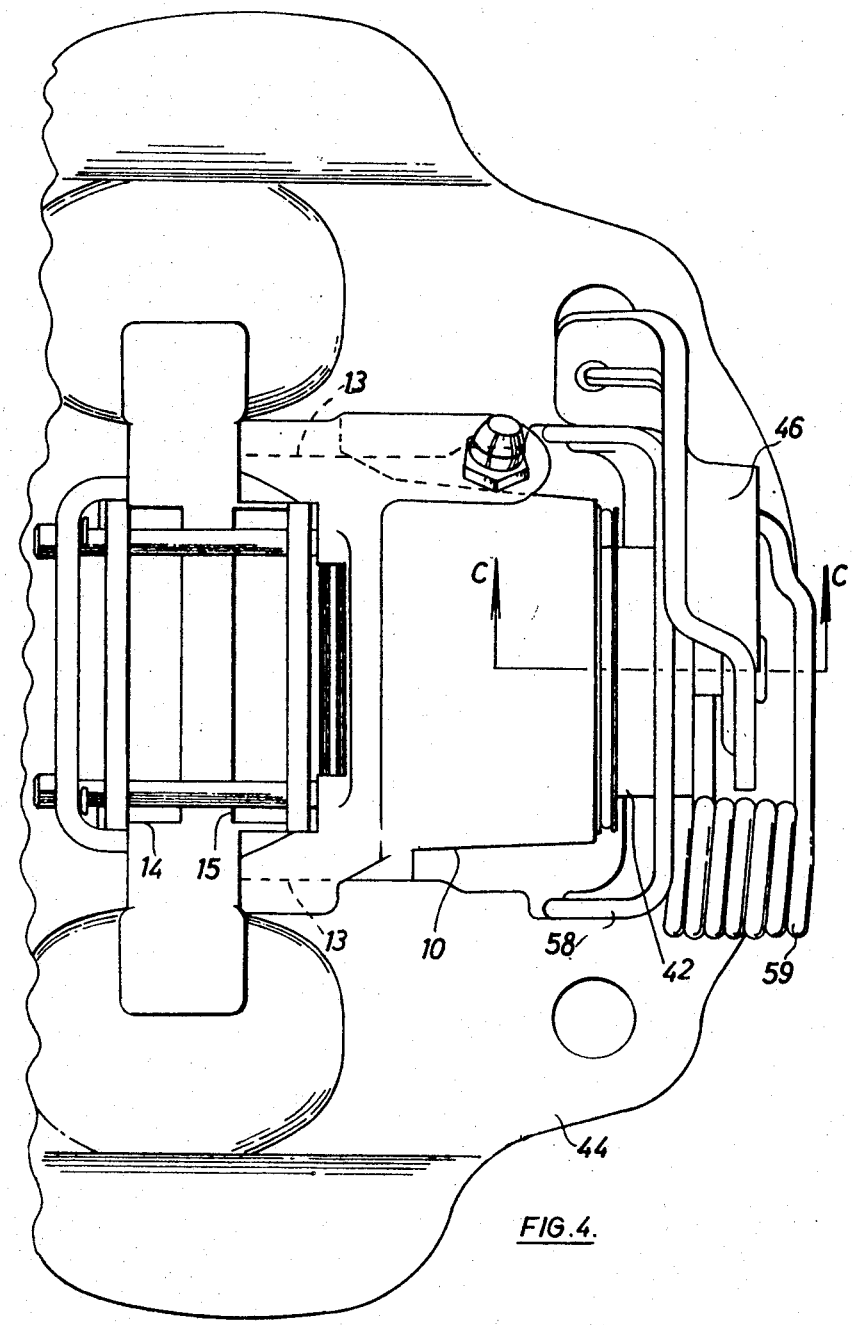
FIG. 4 is a plan view of a second embodiment of brake constructed in accordance with the invention.

Referring to FIGS. 1, 2 and 3 of the drawings, a spot-type disc brake includes a body member 10 adapted to be secured by lugs (not shown) integral therewith to a fixed part of the front wheel mounting of a vehicle to which the brake is to be fitted. A yoke 12 is slidably mounted in grooves 13 in the sides of the body member and supports an indirectly operated pad 14. The body member 10 locates a directly operated pad 15 opposed to the pad 14. Leaf springs 16 prevent the yoke from rattling in the body member.

The brake is provided with a hydraulic actuator 17 and a mechanical actuator 18. The hydraulic actuator 17 comprises a pair of opposed hollow pistons 19 and 20 slidable in a bore 21 in the body member 10 and sealed thereto by suitable sealing rings. The piston 19 abuts the pad 15 and the piston 20 abuts the yoke 12.

The mechanical actuator is in the form of a rotary face cam comprising a rotatable disc 22 and three balls 23 riding in grooves in the rear face of the disc 22 and in the base of the piston 20, the bottoms of such grooves being helically inclined to provide cam surfaces. The piston 20 has a transverse groove 26 in its rear face as shown in FIG. 3, the yoke being received in this groove to prevent the piston 20 from turning and to locate the yoke. Clockwise movement (in FIG. 2) of the disc 22 creates a thrust which is applied through a strut 24 and a sleeve 25 screwed thereon to the piston 19 and a counterthrust which is applied to the piston 20.

The face cam 18 is housed within the piston 20 and the open end of the bore within this piston is closed by a disc 27 which is sealed by sealing rings to the bore of the piston 20 and to the strut 24. A spring ring holds the disc 27 in place. A Belleville washer 28 between the rotatable disc 22 and the closure disc 27 prevents the disc 22 and the balls 23 from rattling.

The disc 22 is angularly displaceable in a clockwise direction (in FIG. 2) by means of a cam 30 whose axis is parallel to but offset from the axis of the face cam 18. The cam 30 engages in a recess 33 in one face of the disc 22 and is formed on the inner end of a spindle 31 journalled in the end wall of the piston 20 as can be readily seen from FIG. 3. A lever 32 is secured to the exposed end of the spindle 31. An upward pull on the free end of the lever 32, as indicated by the arrow P in FIG. 2, serves to turn the cam 30 and so actuate the face cam 18 to apply the brake.

The strut 24 and the sleeve 25 form part of an automatic adjuster of the kind described in co-pending U.S. Patent application No. 618,914 filed Feb. 27, 1967 by G. P. R. Farr (cognate), and housed within the hollow piston 19. The operation of the automatic adjuster will not be described herein. Suffice it to say that the sleeve 25 is automatically turned about the strut 24 to effect adjustment when such adjustment is needed.

The brake illustrated in the drawings is eminently suitable for a front brake of a front-wheel drive vehicle when it is desired that the parking brake should operate on the front wheels. In this case the parking brake acts through a cable which applies a vertical pull on the lever 32. Because the cam spindle 31 is offset from the axis of the face cam 18 the design of the yoke 12 is not in any way governed by the provision of the spindle 31. Also the lever 32 lies above the yoke and not axially beyond the yoke so that a brake of minimum axial dimensions is obtained.

The embodiment of brake illustrated in FIGS. 4 to 7 of the drawings is in many respects similar to the brake of FIGS. 1 to 3 and like parts are denoted by like reference numerals. However, the brake of FIGS. 4 to 7 has further advantageous features. The brake of FIGS. 4 to 7 differs principally from the brake of FIGS. 1 to 3 in that the piston 20 is replaced by a cup-shaped piston 40 whose blind bore 41 faces outwardly. The rotatable cam disc 22 is retained in the blind bore 41 by a cover 42 forming the complementary part of the face cam comprising the three balls 23 riding in grooves in the rear face of the disc 22 and in the inside face of the cover 42. The cover 42 is secured to the cup-shaped piston 40 in a sealing manner. The Belleville washer 28 is replaced by a helical spring 43 as more space is available in the embodiment of FIGS. 4 to 7. The cam spindle 31 with the cam 30 for turning the cam disc 22 is journalled in the cover 42 about an axis parallel to but offset from the axis of the hydraulic actuator comprising the piston 40 and the piston (not illustrated) corresponding to the piston 19 of the embodiment of FIGS. 1 to 3. The yoke 44, which in most respects is similar to the yoke 12 of the FIGS. 1 to 3, is located in a groove 45 running across the cover 42. A lever 46 secured to the outer end of the cam spindle 31 is located in a slot 47 in the yoke 44 to prevent the cam 30 from being axially displaced.

Figure 7:
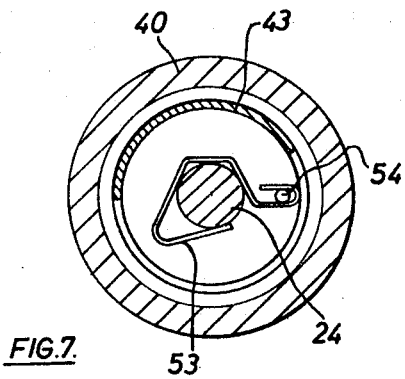
FIG. 7 is a detail section on the line D—D of FIG. 6.

The cam disc 22 has a blind bore 48 which receives the end of the strut 24 forming part of an automatic adjuster as illustrated in FIG. 1 of the drawings. The strut 24 has a domed end 49 by which it engages the flat base of the blind bore 48 in which the end of the strut 24 is received with clearance. Friction between the strut and the disc 22 is thereby kept to a minimum. A sealing ring 50 seals the strut 24 to the piston 40 which in turn is sealed by a sealing ring 51 to the bore 21 through the body member 10. A seal 52 around the cam spindle 31 prevents ingress of dirt into the cam mechanism. A spring 53 located on a pin 54 secured to the piston 40 resiliently engages the strut 24 as shown in FIG. 7 and serves to prevent the strut from rotating when the non-illustrated piston is being screwed in to enable a worn pad 15 to be replaced by a new pad.

Figure 5:
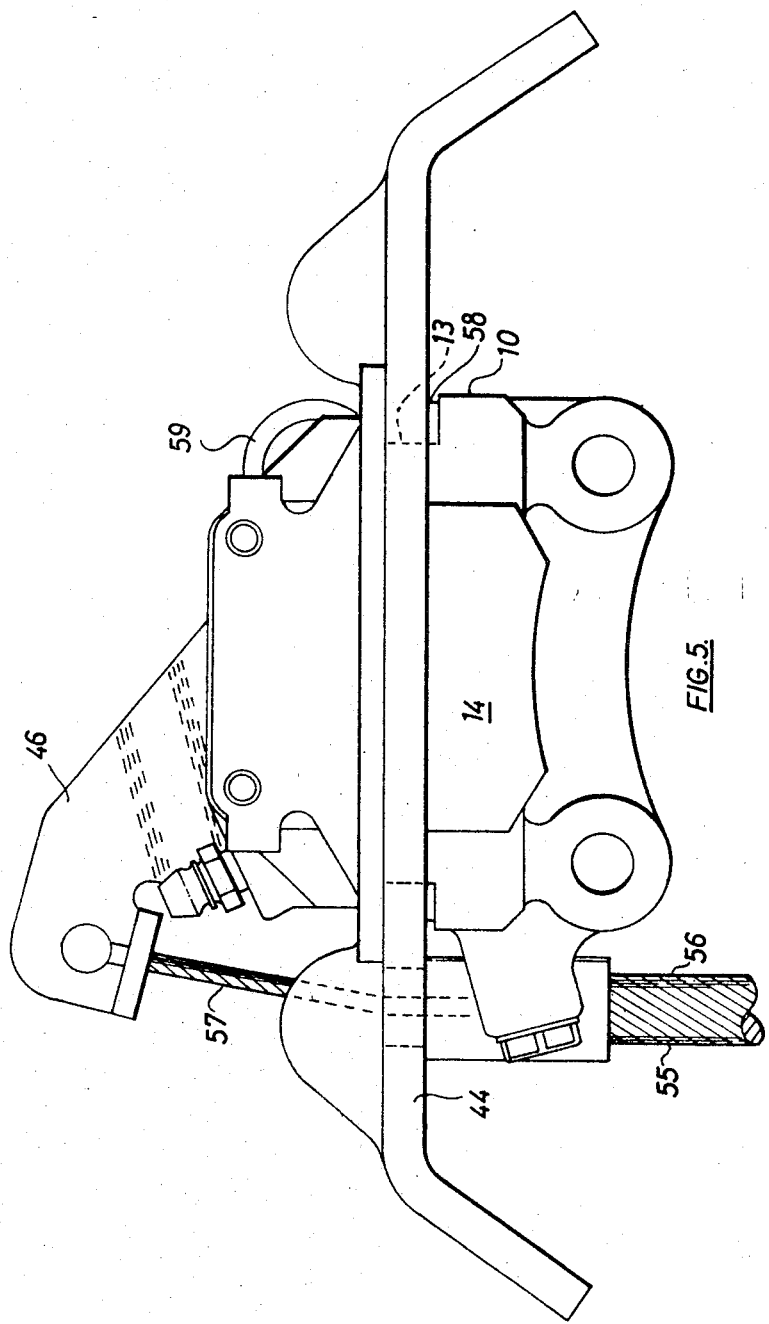
FIG. 5 is a front elevation of the brake of FIG. 4.
Figure 6:
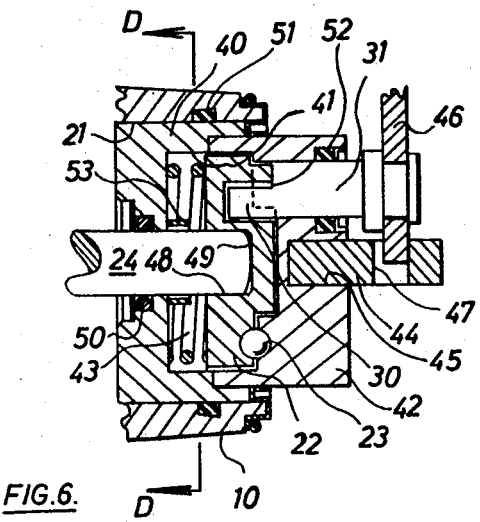
FIG. 6 is a detail section on the line C—C of FIG. 4.

As can be seen most clearly from FIG. 5, a bowden cable 55 for the hand brake comprises an outer sheath 56 which abuts the yoke 44 and an inner cable core 57 which passes through an aperture in the yoke and is attached to the free end of the lever 46. When the handbrake is applied the reaction from the sheath 56 acting upwardly upon the yoke 44 holds the yoke against the radially outer faces of the grooves 13 of the body member 10, resisting the tendency for the anticlockwise (FIG. 5) turning of the lever 46 by the cable core 57 to tilt the yoke 44 in a similar direction. This prevents a spring 58, biassing the yoke 44 radially outwardly relative to the body member 10, from being over-stressed. Alternatively the cable core could be attached to the yoke with the sheath abutting the end of the lever 46. A return spring 59 acts upon the lever 46 in a clockwise direction (FIG. 5).

The mode of operation of the embodiment illustrated in FIGS. 4 to 7 is identical to that of FIGS. 1 to 3 except that the lever 46 is rotated anticlockwise in FIG. 5 to apply the brake whereas the lever 32 shown in FIG. 2 is rotated clockwise.

The invention is applicable to drum brakes as well as disc brakes. In the case of a drum brake the piston accommodating the rotary face cam conveniently acts upon a brake shoe web. In this case, and in the case of a swinging caliper type disc brake, the rotary face cam acts upon an automatic adjuster co-operating with the base of a blind bore in the body member, the piston accommodating the rotary face cam being slidable in this blind bore.

I claim:
1. In a brake actuating mechanism having a hydraulic actuator which includes a hollow piston adapted to act at least indirectly on a brake pad and a reaction member, the hydraulic pressure acting between said piston and said reacting member; a mechanical actuator which comprises face cam means operative between said piston and said reaction member and including a rotatable cam member contained within said hollow piston, a second cam journalled in said piston for turning movement about an axis offset from the longitudinal axis of said piston and in operative engagement with said rotatable cam member for actuating said face cam means, and means for turning said second cam about its axis.

2. A brake actuating mechanism according to claim 1 for a disc brake which includes a body member, a yoke and means slidably mounting said yoke on said body member, wherein said hydraulic actuator is contained in said body member and said piston acts on said yoke.

3. A brake actuating mechanism according to claim 1, which further comprises an automatic adjuster, said face cam means acting upon said reaction member through said automatic adjuster.

4. A brake actuating mechanism according to claim 1, in which said face cam means comprises opposed helically inclined cam surfaces and rolling members rolling on and between said cam surfaces.

5. A brake actuating mechanism according to claim 1 in which said piston comprises a cup-shaped member and a closure disc therefor and sealed thereto, said closure disc having an axial bore therethrough and said cup-shaped member having a base wall with an offset bore therein, and in which said mechanism includes a strut passing through and sealed to said axial bore in said closure disc and acted upon at one end by said face cam means and in thrust transmitting relationship with said reaction member at its other end and said second cam has a cam spindle passing through said axially offset bore in said base wall.

6. A brake actuating mechanism according to claim 5 in which said strut has a domed end, said face cam means acting upon said domed end of said strut.

7. A brake actuating mechanism according to claim 5 in which said face cam means includes a non-rotatable part co-operable with said rotatable member, and in which said base wall of the cup-shaped member constitutes said non-rotatable part of said face cam means.

8. A brake actuating mechanism according to claim 7 which further includes a spring fitted between said closure disc and said rotatable member of the face cam means.

9. A brake actuating mechanism according to claim 1 in which said piston comprises a cup-shaped member and a cover therefor, said cup-shaped member having a base wall with an axial bore therein and said cover having an offset bore therein, and in which said mechanism includes a strut passing through and sealed to said axial bore in said base wall and acted upon at one end by said face cam means and in thrust-transmitting relationship with said reaction member at its other end and said second cam has a cam spindle passing through said axially offset bore in said cover.

10. A brake actuating mechanism according to claim 9 in which the cover is in sealed relationship with said cup-shaped member and said cam spindle of the second cam is journalled in said axially offset bore in the cover, means being provided to seal said cam spindle to said axially offset bore.

11. A brake actuating mechanism according to claim 9 in which said strut has a domed end, said face cam means acting upon said domed end of said strut.

12. A brake actuating mechanism according to claim 9 in which said face cam means includes a non-rotatable part co-operable with said rotatable member, and in which said cover constitutes said non-rotatable part of the face cam means.

13. A brake actuating mechanism according to claim 12 which includes a spring fitted between said base wall of the cup-shaped member and said rotatable member of the face cam means.

14. A brake actuating mechanism comprising a hydraulic actuator which includes a body containing a through bore, a first piston slidable in said bore and adapted to act at least indirectly on a brake pad and a second piston slidable in said bore, the hydraulic pressure acting between said pistons, and a mechanical actuator which comprises face cam means operative between said first and second pistons, a second cam, means journalling said second cam for turning movement about an axis parallel to but offset from the longitudinal axis of said pistons, said second cam being in operative engagement with said face cam means for actuating said face cam means and means for turning said second cam about its axis.

15. A brake actuating mechanism according to claim 14 in which said first piston is hollow and said face cam means includes a rotatable member contained within said hollow piston, said second cam being journalled in said hollow piston.

References Cited

UNITED STATES PATENTS

| 3,155,195 | 11/1964 | Brawerman. | |
|-----------|---------|------------|---|
| 3,211,263 | 10/1965 | Harrison. | |
| 3,243,016 | 3/1966 | Swift. | |
| 3,245,500 | 4/1966 | Hambling et al. | |
| 3,255,848 | 6/1966 | Harrison | 188—73 |

GEORGE E. A. HALVOSA, *Primary Examiner.*

U.S. Cl. X.R.

74—99, 107; 188—73; 192—93